United States Patent [19]

Jackson

[11] Patent Number: 4,765,670
[45] Date of Patent: Aug. 23, 1988

[54] AUTO FLOOR MAT WITH DRAIN

[76] Inventor: Stonewall Jackson, Rte. 7, Box 339, Connersville, Ind. 47331

[21] Appl. No.: 105,035

[22] Filed: Oct. 6, 1987

[51] Int. Cl.[4] .............................................. B60N 3/04
[52] U.S. Cl. ...................................... 296/1 F; 15/216
[58] Field of Search ................ 296/1 F, 38; D12/203; 15/215, 216, 238

[56] References Cited

U.S. PATENT DOCUMENTS

| D. 160,554 | 10/1950 | Sherman | D12/203 |
|---|---|---|---|
| D. 288,799 | 3/1987 | Peress | D12/203 |
| 1,091,321 | 3/1914 | Fleury | 296/38 |
| 2,650,855 | 9/1953 | Peirce | D12/203 X |
| 3,050,329 | 8/1962 | Pagan | 296/1 F |
| 3,149,875 | 9/1964 | Stata | 296/1 F |
| 3,284,836 | 11/1966 | Ioppolo | 296/1 F |
| 4,211,447 | 7/1980 | Di Vincenzo | 296/1 F |
| 4,280,729 | 7/1981 | Morawski | 296/1 F |
| 4,406,492 | 9/1983 | Cackowski | 296/1 F |
| 4,420,180 | 12/1983 | Dupont et al. | 296/1 F |

FOREIGN PATENT DOCUMENTS

| 2709001 | 7/1978 | Fed. Rep. of Germany | 296/1 F |
|---|---|---|---|
| 3231672 | 2/1984 | Fed. Rep. of Germany | 296/1 F |

*Primary Examiner*—Dennis H. Pedder
*Attorney, Agent, or Firm*—Shlesinger Arkwright & Garvey

[57] ABSTRACT

In accordance with the above recited objects, the automobile floor mat of the present invention is constructed of a single piece of flexible material which is basically of a uniform overall thickness into which sloping grooves or troughs are molded or cut for directing fluid dripping from the footwear of the driver or a passenger down into a collecting trough or sump at the rear of the mat where such fluid is drawn off into a closed storage tank which is connected to the floor mat by a leak-proof flexible tube connection which has quick-disconnect means for readily separating the storage tank from the mat proper so that the storage tank may be removed from the mat without disturbing the placement of the mat, and the storage tank then emptied for subsequent reconnection to and reuse with the floor mat.

4 Claims, 2 Drawing Sheets

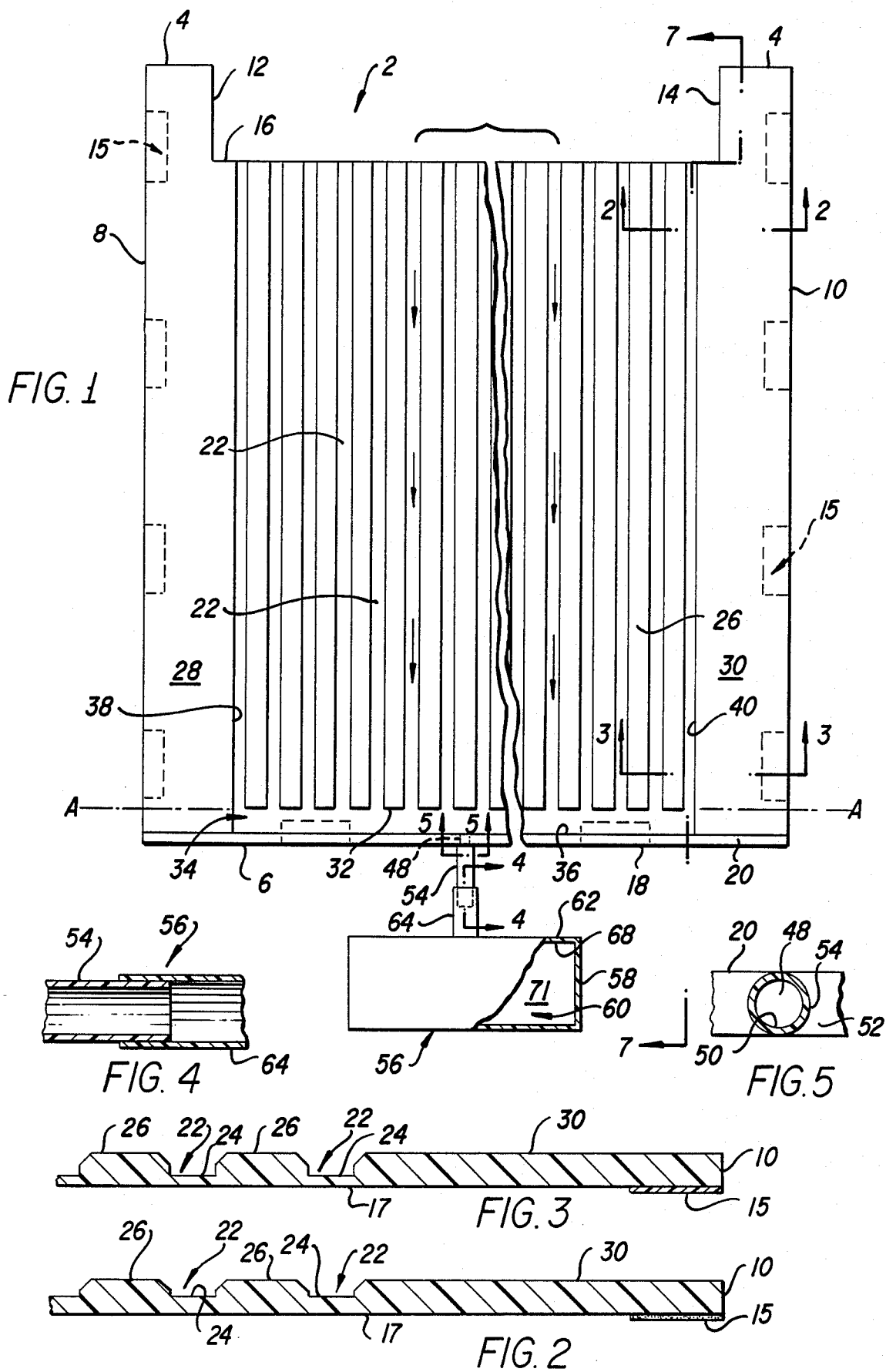

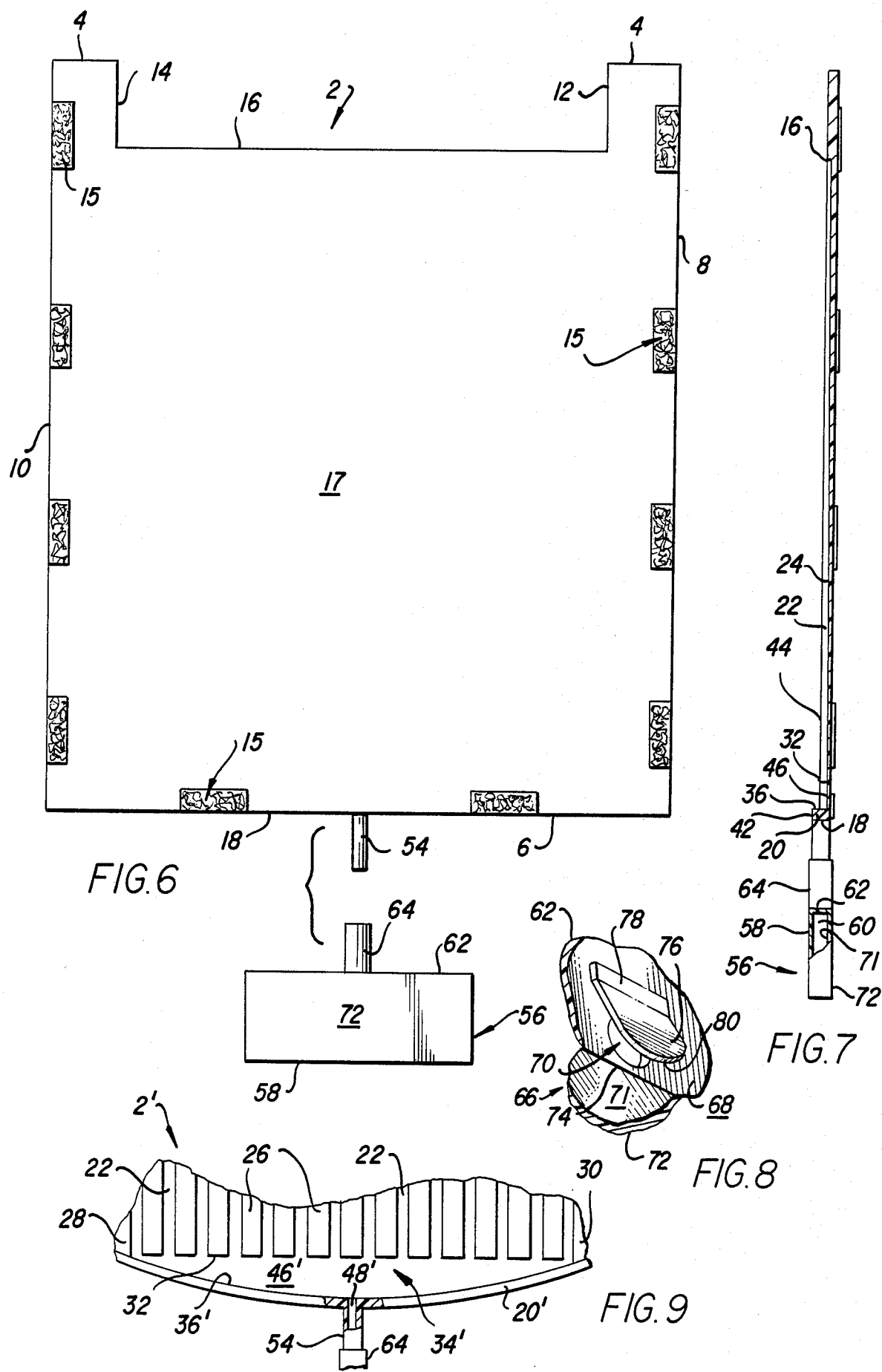

AUTO FLOOR MAT WITH DRAIN

THE FIELD OF THE INVENTION

This invention primarily relates to an improved automobile floor mat of the type which is used under the feet of vehicle occupants. The invention is directed to improved means for draining, collecting and storing water dripping from the footwear of the driver, or other occupant of a vehicle, when they enter the vehicle after having been out in the rain or snow.

This invention also concerns drainage mats, broadly, for uses other than in an automobile. For example, the drainage mat of this invention, and its associated liquid collection and storage tank means, may be used in the vestibule of a house or place of business inside the entrance door on the floor, or outdoors on a porch or other protected area, for draining and drying footwear which has been removed by the wearer and placed on the mat for that purpose, after being out in the rain or snow. In fact, the drainage mat of this invention can be used to drain any appropriate "wet" articles, other than footwear, where it is necessary or desirable to collect and store the drained liquid for any purpose, from a simple desire to keep a floor, or other supporting surface, dry, to the necessity to contain corrosive and/or toxic fluids.

Examples of such other articles are "wet" dishes, or even manufactured articles of other types made of wood, metal or any type material, which have been subjected to a wetting agent, and where it is desired to drain the excess wetting agent and collect same. Also the substance drained and collected may be water and/or any other liquid or liquids/fluids and/or viscose mixtures of liquids and/or fluids and/or solids that may drip from wet footwear and/or other articles that may be readily supported on the article supporting means of the present invention.

Accordingly, for the purpose of this application, the word, "article" is intended to include all appropriate types of articles as discussed above, and the words "fluid" and "fluids" are intended to include all forms and combinations of liquids, fluids, and viscose mixtures such as discussed above.

HISTORICAL BACKGROUND

In bad weather much water, snow, mud and the like are brought into automobiles on the footwear of the driver and passengers of automobiles. If provision is not made for draining and collecting such fluids away from the area on the automobile floor immediately below where the driver and passengers place their feet, such water, melted snow, fluid mud and the like will then simply sink into and rot the automobile floor carpet and eventually corrode the floor of the vehicle. In addition, and especially as the result of a deep snow, puddles of water can form into which the driver's or passenger's pant cuffs or long dresses could dip and thereby become soiled.

There are a number of prior art patents which have proposed solutions for this problem and which show various means for collecting and/or draining off water and snow melt from footwear, none of which proposed solutions are considered completely satisfactory. Examples of these patented devices are shown in: U.S. Pat. Nos. 2,650,855 to Peirce; 3,149,875 to Stata; 3,284,836 to Ioppolo; 4,211,447 to DiVincenzo; 4,280,729 to Morawski and 4,420,180 to Dupont. U.S. Pat. No. 4,262,048 to Mitchell shows the securing of a floor mat to a carpet material by means of Velcro ® (hook and loop type fastener) pads.

OBJECTS OF THE INVENTION

The primary object of the invention is to provide an automobile floor mat which will quickly drain dripping water, snow melt and mixtures of water/snow melt/mud/sand, etc., from the footwear of the driver and passengers of motor vehicles to a collection point which is remote from the area of the floor mat upon which the driver and passengers would normally rest their feet, so that such fluids will not again contact the footwear or the clothing of the driver or passengers, or the rug or other normal covering on the floor of the vehicle.

Another object of the invention, once the dripping fluids have been so remotely collected, is to draw-off from the mat the thus collected fluids into a storage tank where they are completely protected from returning to the floor mat proper, or from accidentally spilling onto the floor of the vehicle by sloshing or other motion of such fluids caused by bouncing, swaying or other motion of the car once the car has started moving.

A further object of the invention is to eliminate in a positive, orderly and clean manner the possibility of water, etc., which has been trooped into an automobile on the feet of the driver and passengers, soiling and/or deteriorating the flooring of the automobile, or its covering, or the clothing of the passengers, without having to "doctor" or modify the car by making openings therein for drainage, etc., which modifications to the car themselves might eventually contribute to the deterioration of the car, the very deterioration they originally were intended to prevent.

It is a further object of the invention to have the fluid storage means easily disconnectable from the floor mat proper so that the storage tank can be easily removed from the automobile for emptying and reconnection to the floor mat without disturbing the floor mat.

A further object of the invention is to accomplish the above recited objects in an efficient, simple and inexpensive manner.

Another object of the invention is to provide a drainage mat for use on substantially horizontal surfaces which has article supporting means, fluid collecting means, drainage trough means under the article supporting means and communicating with the fluid collecting means, and quickly disconnectable fluid storage tank means for receiving fluids collected by the collecting means, so that the fluid storage tank can be easily disconnected from the drainage mat, then lifted away from the mat and taken and emptied at/in an appropriate liquid/fluid disposal site/device, and the empty storage tank again connected to the mat drain connection, without ever disturbing the placement or basic utility of the mat proper.

A further object of the invention is to construct an automobile floor mat which has good drainage characteristics yet is made with a minimum amount of material and is light weight for ease of installation and use.

A futher object of the invention is to provide an automobile floor mat made of flexible material so that it can readily fit the variously shaped floors of different types of automobiles while still adequately performing its drainage function.

Other and more specific objects of the invention will become evident upon reading the full description of the invention which will be given herein below.

SUMMARY OF THE INVENTION

In accordance with the above recited objects, the automobile floor mat of the present invention is constructed of a single piece of flexible material which is basically of a uniform overall thickness into which sloping grooves or troughs are molded or cut for directing fluid dripping from the footwear of the driver or a passenger down into a collecting trough or sump at the rear of the mat where such fluid is drawn off into a closed storage tank which is connected to the floor mat by a leak-proof flexible tube connection which has quick-disconnect means for readily separating the storage tank from the mat proper so that the storage tank may be removed from the mat without disturbing the placement of the mat, and the storage tank then emptied for subsequent reconnection to and reuse with the floor mat.

When the automobile floor mat of the present invention is made of a flexible material, or materials, the mat may be readily used on either a flat or curved floor surface. In uses of the invention other than as an automobile floor mat, as where it might be used for the general purpose drainage of fluids from "wet" articles, and the supporting surface for the mat is flat, such as a floor in a building, the top of a table, or a generally level outdoor supporting surface, the mat can be made of rigid material, or materials. For such uses, a modified form of sump having a curved rear wall may be used to concentrate the drained fluids into the central and the most rearward area of the sump for ready passage thereof into the fluid storage tank.

DESCRIPTION OF THE DRAWINGS

FIG. 1 is a top plan view of the floor mat with the central area broken away to show that the mat can be of any width desired. The fluid storage tank shown at the lower end of this figure is also broken away to show the interior construction thereof.

FIG. 2 is a vertical cross section of the mat taken along the line 2—2 of FIG. 1.

FIG. 3 is a vertical cross section of the mat along the line 3—3 of FIG. 1.

FIG. 4 is a vertical cross section of the leak-proof flexible tube connection means between the floor mat proper and the fluid storage tank, along the line 4—4 of FIG. 1.

FIG. 5 is a vertical cross-section through the leak-proof flexible tube connection means just to the rear of the barrier wall of the sump of the mat, along the line 5—5 of FIG. 1.

FIG. 6 is an exploded bottom plan view of the mat showing the fluid storage tank disconnected from the mat proper intermediate the leak-proof connection means therebetween.

FIG. 7 is a vertical cross-section of the mat along the line 7—7 of FIG. 1 which shows the slope of the bottom surface of one of the troughs or grooves of the mat, and further showing the fluid storage tank partially broken away to show its internal configuration.

FIG. 8 is a broken away perspective view of a flap valve that may be used to permit the flow of fluids into, but to stop the flow of fluids out of, the fluid storage tank of this invention.

FIG. 9 shows a partial plan view of a modified form of mat according to the invention wherein the barrier wall at the rear of the sump is curved so as to concentrate fluids collected in the sump at the most rearward part of the barrier wall at the point where it drains into the leak-proof connection means, shown broken away, to the fluid storage tank which is not shown in this figure.

DESCRIPTION OF THE INVENTION

FIGS. 1-8

FIGS. 1 through 8 show various views of the exterior, as well as cross sectional views, of the preferred embodiment of this invention. Referring to FIG. 1, the automobile floor mat proper is shown at 2. The mat has a front 4, a rear 6, and sides 8 and 10. There is the usual cutout, designated by the lines 12, 14 and 16, for fitting around the foot pedal controls, such as the brake, clutch and gas pedals, of an automobile. Velcro ® (hook and loop type fastener) pads 15 may be molded, bonded or otherwise secured to the bottom surface 17 of the mat 2 for keeping the mat from slipping out of position in automobiles which have rug material installed on the floors thereof. The mat is of uniform thickness throughout except at the very rear edge 18 of the mat, as best shown in FIGS. 2, 3 and 7. A barrier wall 20, see FIGS. 1 and 7, which is higher than the thickness of the mat, extends completely across the rear edge of the mat. The function of this barrier wall will be fully developed in the discussion to follow.

Grooves or troughs 22 are formed in the upper surface of the mat 2, as shown in FIGS. 1, 2, 3, and 7, the bottom surfaces 24 of which grooves or troughs, as best seen in FIGS. 2, 3 and 7, slope downwardly from the front of the mat at the cutout line 16 toward the rear of the mat as shown by the arrows in FIG. 1. These grooves or troughs 22, 24 are substantially parallel to one another. Depending upon the material of which the floor mat is made, the grooves or troughs 22 may be either cut or molded into the top of the mat. It is noted, as best shown in FIGS. 1, 6 and 7 considered together, that the grooves or troughs 22 extend all the way to the front of the work effective area of the mat as defined by the line 16 at the rear of the cutout at the front of the mat. The thus formed grooves or troughs 22 in the top of the mat leave a series of raised interior rib members 26 extending substantially the full length of the upper surface of the mat, which interior rib members 26 comprise the footwear, or other article, supporting means of this invention. The thus formed grooves or troughs 22 also leave two raised side members 28 and 30, as best shown in a comparison of FIG. 1 with FIG. 2 or FIG. 3.

The rear ends 32 of the raised interior rib members 26 end close to the rear 6 of the mat along the imaginary line A—A (see FIG. 1) which demarcates the beginning or front of the trough or sump 34 which comprises the fluid collecting means of this invention. The rear of the trough or sump 34 is defined by the front surface 36 of the barrier wall 20. The sides of the trough or sump 34 are defined by the interior side surfaces 38 and 40 of the raised side members 28 and 30 which extend past the rear ends 32 of the raised interior rib members 26 to the front surface 36 of the barrier wall 20. As can be best seen in FIG. 7, the front surface 36 of the barrier wall 20, the top surface 42 of which rises above the elevation of the top surfaces 44 of the raised interior ribs 26, constitutes the rear wall surface of the trough or sump 34. The bottom surface 46 of the sump 34, from the front to the rear thereof, continues on the same slope gradient as the bottom surfaces of the grooves or troughs 22, which feature is clearly shown in FIG. 7. Accordingly, when the mat of the instant invention is used on a surface which is substantially horizontal, or which slopes from the front to the rear thereof similarily as the grooves or troughs 22 of this invention, fluids dripping from articles placed on the raised interior rib members 26 will drop into the grooves or troughs 22 and, under the influence of the force of gravity, will be directed down the grooves or troughs 22 into the sump 34 and thence across the bottom surface 46 of the sump 34 toward the front surface 36 of the barrier wall 20. The interior side surfaces 38 and 40 of the raised side members 28 and 30, respectively, will act to laterally confine any build-up of fluid in the sump 34 in front of the barrier wall 20.

For use of the mat of this invention as an automobile floor mat, the structure just described is considered adequate for taking care of the normal amount of rain water dripping off the footwear of the driver or passengers in an automobile, at least when the driver is not making large numbers of frequent stops where the driver and/or passengers get out and back in again from the rain, but rather remain in the automobile a sufficient time after entering the automobile for some evaporation of the water which will drain into the sump 34, and where no driving rain enters the automobile and onto the mat while the driver and/or the passengers are entering the automobile. However, exceptional circumstances such as these can be provided for by the addition of fluid storage tank means to such structure, which will now be described.

When the mat of this invention is utilized with a fluid storage tank as shown at the bottom of FIG. 1, the barrier wall 20 is provided with a drainage hole 48 (see FIGS. 1 and 5). The axis of the drainage hole 48 is substantially horizontal, and the bottom of the drainage hole is on the line demarcating the intersection of the bottom surface or floor 46 of the sump 34 and the front surface or side 36 of the barrier wall 20. Molded to, or by other appropriate known means secured to, the rear face 52 of the barrier wall 20, so as to completely surround and be in full open communication with the drainage hole 48 is the water-proof and flexible tube 54 (see FIGS. 4 and 5). For certain uses of the mat, if desired, the fluid draining from the sump through the tube 54 may be disposed of by merely connecting to the end of the tube 54 in press-fit and leak-proof fashion another longer open ended flexible tube (not shown) having a slightly larger diameter than tube 54. With this longer flexible tube connected to the tube 54, similar to the connection shown in FIG. 4, the open end of the longer flexible tube can be directed so as to empty into a nearby floor drain, or to the outside of a building or vehicle onto the ground, as appropriate.

However, for use in vehicles, and in other confined spaces where floor drains are generally not available, fluid storage tank means such as that shown in FIGS. 1, 4, 6 and 7 is preferred. As is shown very clearly when one considers FIGS. 6 and 7 together, the fluid storage tank means 56 comprises a relatively low profile rectangular shaped tank 58 having a hollow interior 60, there being secured to the short front side 62 of the tank 58 a single filling/emptying flexible tube 64 which communicates openly with the interior 60 of the fluid storage tank 58. The connection of the flexible tube 64 to the fluid storage tank 58 is similar to that already described for the connection of the flexible tube 54 to the barrier wall 20 around the drain hole 48 of the floor mat 2. As is shown in FIGS. 1, 6 and 7, and most clearly in FIG. 4, the interior diameter of the flexible tube 64 is such that it allows for a press-fit leak-proof connection over the outside surface of the flexible tube 54. However, the press fit is not so tight as to in any way hamper a ready hand quick-disconnect of the leak-proof connection when the fluid storage tank 58 is full and it is necessary to disconnect it from the mat for emptying and subsequent reconnection to the mat.

In use of the storage tank 58 as shown in FIGS. 1–7, when it is desired to empty the tank 58, the flexible tube 64 is pulled away from the flexible tube 54 with sufficient force to disconnect the press-fit connection between these tubes, while at the same time pinching shut, with the forefinger and thumb of one hand, for example, the flexible tube 64 intermediate its connection to the tube 54 and the tank 58. Appropriate mechanical exterior clamp means (not shown) may also be used to pinch shut the flexible tube 64. Now the tank 58 can be lifted away from the mat 2 without any fear of the contents of the tank 58 spilling onto any part of the interior of the car, and the tank 58 can be transported away from the car to a suitable place for emptying the stored fluid from the tank 58.

In FIG. 8 there is shown a flap valve means 66 that, while permitting the flow of fluids into the fluid storage tank 58, will stop reverse flow out of the fluid storage tank 58. The main purpose of the valve means 66 is to keep stored fluid from leaking out of the storage tank 58 while the tank 58 is disconnected from the mat 2 for emptying the tank 58. The flap valve means 66 is constructed and works in the following manner. In FIG. 8, 68 represents the inside lower face of the front wall 62 of the fluid storage tank 58 of this invention. The hole 70 in the wall 62 is located a short distance above the inside surface 71 of the bottom 72 of the storage tank 58, the line 74 in FIG. 8 representing the line upon which the inside face 68 of the wall 62 meets the inside surface 71 of the bottom 72 of the storage tank 58. The flap 76 of the flap valve means 66 is made of any suitable flexible and spring-like material, and is secured to the interior face 68 of the front wall 62 of the storage tank 58 by bonding, or other appropriate manner of fastening, along the upper end 78 of the flap 76. The lower end of flap 76 may be curved as at 80 to a slightly larger radius of curvature than the hole 70, so that the flap 76 when closed against the interior surface 68 will completely cover the hole 70. The hole 70 where it emerges out to the outside of the tank 58 is in complete communication with the interior of the flexible tube 64. For uses in automobiles where the flow rate of water, etc., would normally be quite slow, the resiliency of the spring-like material of the flap 76 should be fairly sensitive so as not to impede the flow of fluids into the tank. However, the spring in the flap valve 76 is biased slightly toward the hole 70 so that the valve will close quickly when flow from the tube 64 into the tank 58 ceases.

Once the fluid in the storage tank rises above the level of the lower end 80 of the valve flap 76, the fluid above that level will assist the spring action of the flap in its tendency to close the valve means 66. This will insure that the valve means 66 stays closed when the tank 58 is disconnected from the mat 2 for emptying, and at all other times except when the pressure of draining fluid in the flexible tube 64 is sufficient to overcome the resistance of both the spring action of the valve flap 76 and any back pressure of fluid in the tank 58 against the rear of the valve flap 76.

In the use of a storage tank 58 employing a flap valve means such as shown at 66 in FIG. 8, when it is desired to empty the tank 58 the flexible tube 64 is pulled away from the flexible tube 54 with sufficient force to disconnect the press-fit connection between these tubes. Now the tank 58 can be lifted away from the mat 2 without any fear of the contents of the tank 58 spilling onto any part of the interior of the car, and can be transported away from the car to a suitable place for emptying the stored fluid from the tank 58. The simple form of flap valve 76 shown in FIG. 8 may be opened for emptying the fluid storage tank 58 by means of a small diameter rod (not shown) which is sufficiently longer than the flexible tube 64 to push the valve flap 76 open when desired, and which rod may be stored on clips (not shown) attached somewhere on the outside of the storage tank 58 (as appropriate).

FIG. 9

In the modified mat 2' shown in FIG. 9 the only difference is that the barrier wall 20' is curved so that the front surface 36' of the barrier wall 20' will serve to facilitate the concentration of fluids running out of the troughs 22 and across the bottom surface 46' of the sump 34' toward the center of the barrier wall 20' where the drainage hole 48' communicates into the interior of the water-proof and flexible tube 54, which in turn communicates with the quick-coupled flexible tube 64 which is attached to and communicates with the interior of the fluid storage tank 58 (not shown). While curved barrier walls such as 20' may be used on all types of drainage mats according to this invention, i.e., flexible or rigid mats, and whether used on flat surfaces or concave surfaces, a curved barrier wall is especially desirable on drainage mats that are used on flat surfaces, where there is no concave surface underlying a flexible mat, or where a rigid mat is not contoured to fit into a concave supporting surface, to otherwise concentrate the flow of drained fluid toward the drainage hole 48 or 48'.

As already mentioned above, the downward slope of the troughs or grooves 22 toward the rear of the mats 2 and 2' continues across the sumps 46, 46' to the front sides of the barrier walls 20, 20'. In most cars the floor also slopes downwardly from the position of the control pedals near the front of the car toward the rear of the car, the floor of the car usually continuing to slope downwardly all the way from the position of the control pedals at least to well under the car seat. In this situation the fluid storage tank 58, which will usually be positioned just in front of or under the seat, will be sloping rearwardly itself, so that gravity flow of draining fluid into even the rear of the storage tank 58 will not require any modification of the gradients of the mats 2 or 2' as shown in FIG. 7. However, in cars where there might be no slope, or very little slope, between the control pedals and the seat, adequate flow into the storage tank can be assured by forming, or otherwise securing, under the body of the mat 2 or the mat 2', a sufficient number of vertical spacing patches (not shown) to lift the mats and thereby the bottoms of the grooves or troughs 22, 22' and the troughs or sumps 34, 34', an adequate additional amount of elevation above the floor of the car and the inside surface 71 of the bottom 72 of the fluid storage tank.

While the various embodiments and features of the invention as hereinabove described all specifically pertain to and are described in connection with uses of the invention as an automobile floor mat with a fluid drainage and storage capacity, it is again emphasized, as pointed out in THE FIELD OF THE INVENTION at the beginning of this specification, that it should be understood that the invention may equally be advantageously used for the general purpose drainage of fluids from "wet" articles of all types, whether in the household, the market place, in factories, or for outdoor industrial fluid drainage and collection purposes. Also, for commercial and industrial uses it is contemplated that the mats and storage tanks can be significantly larger. In fact, the storage tanks could be large enough to require a crane to lift them. Also, in commercial and industrial uses, the slopes of the troughs such as 22, and across the sump 34, can be significantly steeper in proportion, depending upon what types and volumes of "wet" fluids are being drained from the articles involved.

Furthermore, the capacity of storage tanks used in commercial and industrial uses may be increased, as appropriate, by raising the height of the supporting base of either of the mats 2 or 2' to accommodate the use of tanks of increased depth below the levels of the floors 46 or 46' of the sumps 34 or 34' of the drainage mats 2 or 2'. Moreover, in commercial and industrial applications especially, and also in the use of the invention in automobiles, an extra storage tank, or tanks, may be provided for each drainage mat so that once a storage tank becomes filled it can be disconnected and immediately replaced by a spare storage tank, so that maximum capacity and completely efficient drainage and storage of fluids from continuous loading, unloading and reloading of a mat with more articles can proceed uninterrupted. Also, the materials of which the mat and storage tank are made could vary considerably. For example, for heavy industrial uses, the materials could be heavy steel, or an appropriate non-corrosive material, or a heavy structural material coated with a non-corrosive material.

Furthermore, the simple press-fit quick-disconnect means described above for an automobile floor mat, could have substituted therefore, in an industrial use, a fluid-tight heavy metal and spring quick-disconnect means. Also, in such industrial uses, depending upon the types and quantities of fluids drained, and the slopes of the troughs, other heavier duty and more positive acting valves could be substituted for the flap valve means 66 described above. Finally, when the invention is used for other purposes than as an automobile floor mat, such as when used for general purpose drainage of footwear in the vestibule of a residence or office building, or for industrial applications, as just mentioned above, for example, the cut-out 12, 14, 16, shown at the front end of the mat may be dispensed with. In such cases, the cut-out may be replaced by continuing the side members 8, 10 across the front of the mat, or by extending the troughs or grooves 22 and the raised interior rib members 26 to the front edge of the mat as shown by the numerals 4 in FIGS. 1 and 6.

Finally, the completely closed storage tank of this invention, when it is to be used for industrial purposes and is provided with heavy duty and more positive acting valve means, with all parts of the tank and its accessories being appropriately constructed of, or coated with, non-corrosive materials, and when used with a similarly non-corrosive treated drainage mat, would be especially well suited to draining, collecting and storing toxic and hazardous waste type article "wetting" or "chemical" treatment fluids in an environmentally suitable manner.

While this invention has been described as having preferred designs, it will be understood that it is capable of further modification. This application is, therefore, intended to cover any variations, uses, or adaptations of the invention following the general principals thereof and including such departures from the present disclosure as come within known or customary practice in all the arts to which this invention may reasonably be considered to pertain, and as may be applied to the essential features hereinbefore set forth and fall within the scope of this invention or the limits of the claims.

What I claim is:

1. A drainage mat:
   (a) said mat having substantially uniform thickness and having a front, rear, sides and substantially parallel top and bottom, substantially smooth and unobstructed planar surfaces;
   (b) said top planar surface including a series of spaced parallel grooves of uniform width formed therein and extending substantially from said front to said rear of said mat;
   (c) a collecting trough at said rear of said mat and positioned at the end of said grooves;
   (d) said grooves each having a floor coplanar with floors of adjacent grooves;
   (e) said coplanar floors of said grooves increasing gradually in depth relative to said top surface from said front to said rear of said mat and having a shallow front and deeper rear;
   (f) said top and bottom planar surfaces of said mat having outer marginal areas on either side thereof and having a width substantially wider than a width of said groove;
   (g) said collecting trough having a floor merging with said rear of said grooves and substantially coplanar with said floor of said grooves at said rear;
   (h) said rear of said mat including a barrier wall extending from one of said marginal outer areas to the other of said marginal outer areas, said barrier wall of a height at least equal to the thickness of said mat;
   (i) storage means removable from said mat and having a floor positioned substantially coplanar with said bottom of said mat; and
   (j) said storage means including a drainage means connectable to said barrier wall for draining fluid collected in said collecting trough to said storage means.

2. A drainage mat, as in claim 1, wherein:
   (a) said barrier wall is curved.

3. A drainage mat, as in claim 1, wherein:
   (a) said grooves include beveled edges.

4. A drainage mat, as is claim 1, wherein:
   (b) said storage means includes valve means to prevent fluid backflow from said storage means into said collecting trough.

* * * * *